J. WAHLBERG.
INDICATING MICROMETER GAGE.
APPLICATION FILED OCT. 26, 1908.
937,662.
Patented Oct. 19, 1909.
2 SHEETS—SHEET 1.
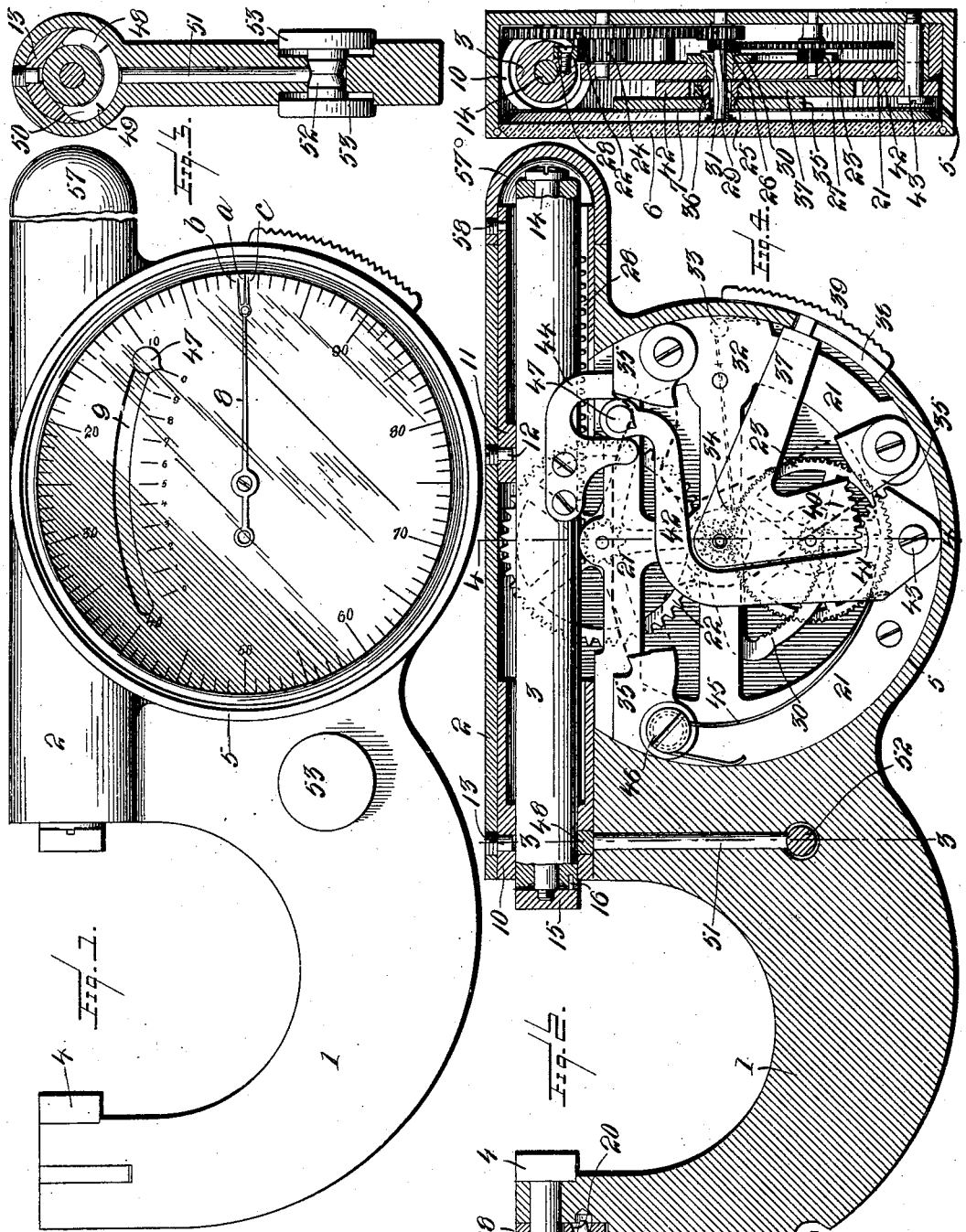
WITNESSES:
INVENTOR
John Wahlberg
BY
Attorney J. WAHLBERG.
INDICATING MICROMETER GAGE.
APPLICATION FILED OCT. 26, 1908.
937,662.
Patented Oct. 19, 1909.
2 SHEETS—SHEET 2.
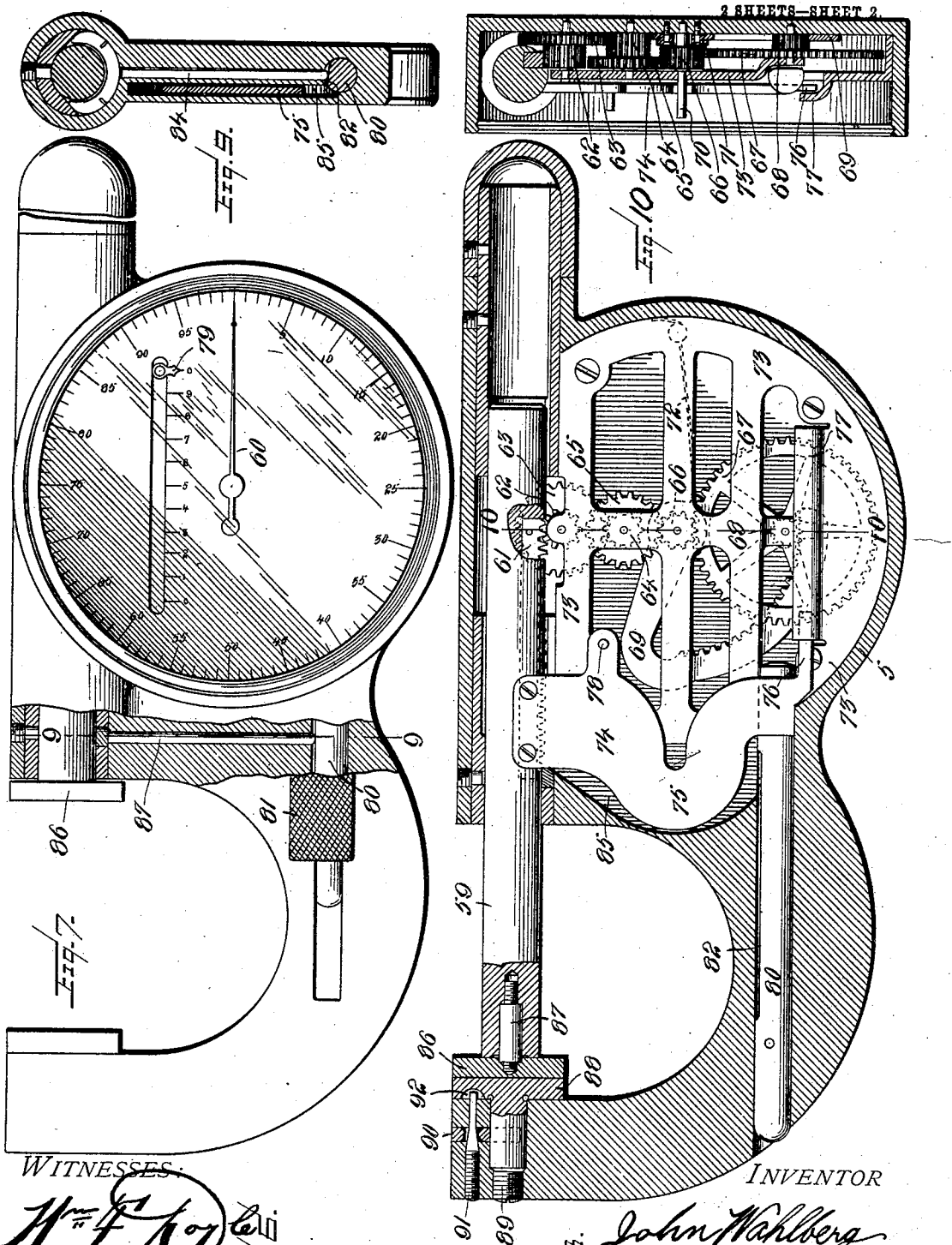
WITNESSES
INVENTOR
John Wahlberg
by
Attorney

UNITED STATES PATENT OFFICE.

JOHN WAHLBERG, OF NEW YORK, N. Y.

INDICATING MICROMETER-GAGE.

937,662.  Specification of Letters Patent.  Patented Oct. 19, 1909.

Application filed October 26, 1908. Serial No. 459,550.

*To all whom it may concern:*

Be it known that I, JOHN WAHLBERG, a citizen of the United States, residing at New York, in the county of New York, State of New York, have invented certain new and useful Improvements in Indicating Micrometer-Gages, of which the following is a description, reference being had to the accompanying drawings, forming a part hereof.

My invention relates to an improved dial or indicating micrometer gage for measuring the thickness or diameter or other dimensions of various objects, and includes means whereby the dimension measured is directly indicated to the person using the gage by means of a pointer and a graduated dial.

Gages designed to indicate the dimension of the part measured in fractions of an inch or other unit of measure by means of a rotary pointer moving over a graduated dial necessarily have quite a number of movable coacting parts, and considerable difficulty has been encountered in efforts to so design and arrange these parts that lost motion between them will be eliminated and that the dimension indicated upon the graduated dial will correspond with the actual dimension of the part measured by the gage, or, as differently expressed, to so design the gage that the distance between the movable jaws commonly present in such gages will be correctly indicated by the rotary pointer and dial.

My invention is designed with reference to eliminating as much as possible the lost motion above referred to, and includes mechanism as hereinafter disclosed for accomplishing the purpose stated.

My invention also includes various minor and subordinate features of general application in measuring gages, all as shown in the accompanying drawing, described in the following specification, and particularly claimed in the clauses of the concluding claim.

In the accompanying drawings; Figure 1 is a view showing the preferred form of my device in elevation; Fig. 2 is a view chiefly in section, the mechanism through which the rotary pointer is operated, together with certain other parts, being however shown in elevation; Fig. 3 is a sectional view taken upon the line 3—3 of Fig. 2, the parts to be explained by said figure, however, being shown in elevation; Fig. 4 is a sectional view taken upon the line 4—4, Fig. 2; Fig. 5 is a view illustrating the manner of securing the rotary pointer to its shaft; Fig. 6 is a view illustrating a detail of construction; Fig. 7 is a view principally in elevation illustrating a slightly modified form of my device; Fig. 8 is a view principally in section but showing the parts whereby the rotary indicator is operated, and certain other parts, in elevation; Fig. 9 is a sectional view taken upon the line 9—9, Fig. 7; Fig. 10 is a sectional view taken upon the line 10—10, Fig. 8; and Fig. 11 is a detail view.

In the drawings, and referring more particular to Figs. 1 to 4, 1 is the main frame of my improved gage, which frame is provided with a housing 2 within which a reciprocating spindle 3 moves, and which frame is provided with an anvil 4 located in line with said spindle, it being understood that the article to be measured is placed beneath the lower end of the spindle 3 and in contact with the upper surface of the anvil 4, and said spindle moved down until it comes into contact with the article. The frame 1 is also provided with a recess 5 circular in outline and within which is located the mechanism whereby the distance between the elements 3 and 4 is transmitted to a rotary pointer and thereby indicated upon a suitable dial. This recess 5 is open at one side and is provided with a glass 6, and 7 is the dial upon which the distance between the elements 3 and 4 is indicated. This dial is divided into one hundred parts, each of which represents, in the instrument illustrated, one one-thousandth part of an inch.

8 is a pointer supported upon a spindle at the center of the dial and adapted to move thereover. The indicating end of this pointer is provided with three points $a$, $b$ and $c$, as shown in Fig. 1, the point $a$ being for coarse reading, and the points $b$ and $c$ being for the purpose of subdividing the single divisions of the scale over which the pointer moves. The point $b$ is one-half a scale division to the left of the point $a$, and the point $c$ one-fourth a scale division to the right thereof; and it will therefore be seen that, with the dial graduated as shown, if the point $c$ is over one of the scale divisions the actual dimension will be one-quarter of a thousandth of an inch more than the dimension indicated by such division; while if the point $b$ is over a scale division the actual dimension will be one-half of a thousandth of an inch less than the dimension indicated by such division. Thus by means of the feature disclosed it is possible to measure directly, and without resorting to estimating the position of the middle point a, dimensions in quarter-thousandths of an inch. The dial 7 is further provided with a curved slot or opening 9, and said dial is graduated adjacent said opening to thereby provide a second scale which indicates tenths of an inch. The housing 2 is provided with bushing 10 and 11 held in place by set screws 12, 13 and which bushings serve as guides for the reciprocating spindle 3. The spindle 3 is provided with a longitudinal passage through which extends a screw 14, the lower end of which engages and holds in place a detachable face 15 for the lower end of the spindle 3, which face is hardened and ground true as is the usual practice in gages intended for accurate measurements. The lower end of the spindle 3 is provided with a pin 16, and the upper surface of the detachable face 15 is provided with four grooves 17, with any one of which said pin may engage whereby the said face may be secured in any one of four different positions as will be understood from Figs. 2 and 11. The detachable face 15 is preferably square in outline as shown. The anvil 4 is provided with a depending stem as shown, and is secured in place in the frame 1 by means of a clamping member 18 which is drawn against the said stem by means of a pointed screw 19 engaging an opening 20 therein, as will be understood from Fig. 2 of the drawing.

Within the recess 5 of the main frame 1 is located a plate 21, which plate is positioned about midway of the depth of said recess as shown in Fig. 4. This plate is for the purpose of providing bearings for the forward ends, referring to the drawings, of short shafts upon which shafts are gears 22, 23, and pinions 24, 25, 26 and 27, the rear ends of said shafts having bearings in the back or bottom wall of the recess 5.

28 is a rack secured to the spindle 3 and which rack engages with the pinion 24 to thereby operate it and the gear 22 rigidly connected therewith. The gear 22 engages and operates the pinion 25 which is fast upon the spindle 29 to which the pointer 8 is connected.

From the above it will be obvious that motion of the spindle 3 will be transmitted to the pointer 8 and move it over the scale upon the dial 7. The portions of the plate 21 not necessary to provide bearings as above are cut away as shown and as is usual in similar devices.

The pinion 26 is fast upon the spindle 29 and is in engagement with the gear 23, and the pinion 27 is fast upon the shaft carrying the gear 23 so as to move therewith.

30 is a toothed sector in engagement with the pinion 27 and supported by a bushing 31 fitting loosely about the spindle 29 so as not to interfere with its rotary movement.

32 is a spring coiled about a support 33 in the upper part of the recess 5 and the lower end of which engages a pin 34 upon the hub of the toothed sector 30. The purpose of the spring 32 is to prevent lost motion or backlash in the train of gearing through which the pointer is moved and to cause the pointer to follow the movements of the spindle so that the pointer will indicate the actual distance between the spindle and anvil. It will be understood from the drawings that as the spindle 3 moves downward the spring 32 forces the sector 30 against the pinion 27, so that contact is upon the right hand faces of the teeth of said sector, and in like manner each of the gears and pinions considering the train backward from the rack 28 is caused by said spring to follow its coöperating member and thus all the teeth are kept in contact with one another. It will therefore follow that the spring 32 will oppose upward movement of the spindle 3.

The spindle 3 is moved downward to bring its lower end into contact with the article to be measured by means independent of the gearing through which motion of said spindle is transmitted to the pointer 8 as follows: 35 is a spider secured within the recess 5 and located just back of the dial 7. The central portion of the spider is cut away in Fig. 2 in order to permit the parts back of it to be better shown, although its outline is indicated by dotted lines. This spider has at its center and surrounding the spindle 29 but out of contact therewith a bearing 36 in the form of a bushing, which supports a bell crank lever 37. This lever is reduced in size and extends through a slot 38 in the wall of the recess 5, and the extremity of said lever is provided with a knurled or roughened slide 39 to be engaged by the finger of the user. The lever 37 is provided with teeth at 40 which engage like teeth at 41 upon a lever 42 pivoted at 43. The free end of the lever 42 is rounded and engages a yoke 44 secured to the spindle 3. 45 is a spring secured at 46 and bearing at its free end against the lever 42 as shown, and 47 is a pointer carried by the free end of the lever 42 and extending through the slot 9 of the dial 7 to indicate tenths of an inch on the tenths scale adjacent said slot. From the above it will be seen that movement imparted to the finger plate 39 will communicate downward motion to the measuring spindle 3, and that when said finger plate is released the spring 45 will return it to its original position shown and the spindle 3 into its uppermost position.

Means as follows are provided for holding the spindle 3 in any position into which it may have been moved so that measurements taken by the gage may be transferred or compared; and so that the gage may be set to any desired measurement and held in that condition. The bushing 10 is recessed, Fig. 3, and a clamping member 48 consisting of a segment of a ring slitted at 49 inserted in said recess. The ends of the clamping member 48 are formed to coöperate with inclines formed in the bushing 13 at 50. 51 is a rod in engagement with the clamping member 48, and 52 is an operating member having inclined surfaces as shown for engaging the end of said rod 51. The operating member 52 is provided with disks 53 at either end thereof, which disks may be pressed by the user, whereupon the rod 51 will be forced toward the left and the free ends of the locking member 48 pressed against the spindle 3 by coöperation of the ends of said locking member with the inclines 50 of the bushing 13. The end of the spindle 29 is split, Fig. 5, and a tapered screw 54 provided whereby the end of the spindle may be spread to hold the pointer 8 securely in place. The pointer 8 is provided with an elongated bearing 56 as is usual in such devices.

It will be understood from Fig. 2 of the drawing that the upper bushing 11 is provided with a slot within which the yoke 44 enters as the spindle 3 moves into its upper position, and also with a second slot through which the rack 28 moves. The upper end of the housing 2 is closed by a cap 57, which is shown as secured upon the bushing 11 by means of a screw 58.

In the form of my device as shown in Figs. 7 to 10, motion is transmitted from the measuring spindle 59 to the pointer 60 by means of a rack 61 upon the spindle and a train of gearing 62, 63, 64, 65 and 66, Fig. 10; and backlash is prevented by the gear 67 operated by the gear 66 and driving a pinion 68, which engages and operates a toothed sector 69 supported concentric with the spindle 70 carrying the pointer 60 by means of a support 71 carried by the rear or bottom wall of the recess 5. 72 is a spring acting to oppose upward movement of the spindle 59 as in the form of my device first disclosed. In this form of my device the forward ends of the several shafts which carry the gears above mentioned are supported in a single plate 73, and the rear ends of said shafts are supported in the rear or bottom wall of the recess 5. In this form the spindle 59 is provided with an arm 74 which is curved downward at 75 to clear the spindle 70 when said arm is in its uppermost position; and the free end of said arm is provided with an upwardly projecting portion 76 which moves back of and is guided in its movement by a guide 77 formed from the material of the plate 73. The arm 74 has a pin 78 carrying a pointer 79 moving over a tenths scale as in the form previously described. The spindle 59 is reciprocated through the arm 74 by means of a rod 80 and roughened plate 81 to be engaged by the finger of the operator, and said rod is flattened throughout most of its length as at 82. This flattened portion moves adjacent the end of a rod 84 which operates clamping mechanism, see Fig. 9, of the same construction as has been previously described.

The operating rod 80 is capable of a limited rotary movement about its longitudinal axis; and it will be understood from Fig. 9 that the clamping mechanism shown therein may be operated by turning said rod upon its axis by means of the plate 81. The upper end of the rod 80 is provided with a transverse recess on its front side to engage the end of the arm 74 to operate it and the spindle 59, and said rod is also cut away upon its rear side sufficiently and for a sufficient distance to clear the portion of the plate 73 which supports the forward end of the shaft which carries the gear 67 when said rod 80 is moved into its uppermost position. See Figs. 8 and 10.

The main frame of my device is provided with a recess 85 into which the downwardly bent portion 75 of the arm 74 enters as the spindle 59 is moved downward. In this second form of my device the detachable face 86 of the spindle 59 is enlarged and is secured in place by a double ended screw 87; and the anvil 88 is adjustable by means of a screw 89. 90 is a wedge for engaging the depending stem of the anvil 88 as shown, and 91 is a screw provided with a tapering portion to engage a hole in the wedge and force it against the depending portion of the anvil 88. The screw 91 is elongated, and the upper end thereof enters a recess 92 formed in the lower surface of the anvil 88 to thereby prevent said anvil from turning about a vertical axis.

Having thus described my invention and explained the mode of operation thereof, I claim and desire to secure by Letters Patent:

1. In a device of the class described, a frame provided with a housing and with a recess; a spindle within said housing and capable of motion of translation therein; an anvil carried by said frame and located in line with said spindle; a dial located in said recess and provided with a slot; a pointer adapted to move over said dial; a rack carried by said spindle; a train of gearing located within said recess and operated from said rack, and through which movement of said spindle is transmitted to said pointer; means coöperating with said gearing to prevent lost motion therein; means located within said recess and independent of said gearing for moving said spindle to bring it into contact with an article to be measured; a pointer carried by said spindle moving means and adapted to extend through the slot aforesaid; and means exterior to said recess for operating said spindle moving means.

2. In a device of the class described, a frame provided with a housing and with a recess; a spindle within said housing and capable of motion of translation therein; an anvil carried by said frame and located in line with said spindle; a dial located in said recess and provided with a slot; a pointer adapted to move over said dial; a rack carried by said spindle; a train of gearing located within said recess and operated from said rack, and through which movement of said spindle is transmitted to said pointer; means coöperating with said gearing to prevent lost motion therein; a lever within said recess for moving said spindle to bring it into contact with an article to be measured; a connection between said lever and said spindle; a pointer carried by said lever and adapted to extend through the slot aforesaid; and means engaging said lever and extending without said recess for operating said lever.

3. In a device of the class described, a frame provided with a housing and with a recess; a spindle within said housing and capable of motion of translation therein; an anvil carried by said frame and located in line with said spindle; a dial located in said recess and provided with a slot; a pointer adapted to move over said dial; a rack carried by said spindle; a train of gearing located within said recess and operated from said rack, and through which movement of said spindle is transmitted to said pointer; means coöperating with said gearing to prevent lost motion therein; a lever within said recess and pivoted at one end and rounded at its free end; a yoke carried by said spindle and with which the rounded end of said lever engages; a pointer located at the free end of said lever and adapted to extend through the slot aforesaid; and a second lever pivoted intermediate its ends within said recess, one end of said second lever extending without said recess and the other end thereof being connected with said first mentioned lever to thereby operate it.

4. In a device of the class described, a frame provided with a housing and with a recess; a spindle within said housing and capable of motion of translation therein; an anvil carried by said frame and located in line with said spindle; a dial located in said recess and provided with a slot; a pointer adapted to move over said dial; a rack carried by said spindle; a train of gearing located within said recess and operated from said rack, and through which movement of said spindle is transmitted to said pointer; means coöperating with said gearing to prevent lost motion therein; a lever within said recess and pivoted at one end and rounded at its free end and provided with a series of teeth; a yoke carried by said spindle and with which the rounded end of said lever engages; a pointer located at the free end of said lever and adapted to extend through the slot aforesaid; and a second lever pivoted intermediate its ends within said recess, one end of said second lever extending without said recess and the other end thereof being provided with a series of teeth to engage the toothed portion of said first mentioned lever to thereby operate it.

5. In a device of the class described, a frame provided with a housing and with a recess; a spindle within said housing and capable of motion of translation therein; an anvil carried by said frame and located in line with said spindle; a dial located in said recess; a pointer adapted to move over said dial; a rack carried by said spindle; a train of gearing located within said recess and operated from said rack, and through which movement of said spindle is transmitted to said pointer; means coöperating with said gearing to prevent lost motion therein; a lever within said recess for moving said spindle to bring it into contact with an article to be measured; a connection between said lever and said spindle; and means engaging said lever and extending without said recess for operating said lever.

6. In a device of the class described, a frame provided with a housing and with a recess; a spindle within said housing and capable of motion of translation therein; an anvil carried by said frame and located in line with said spindle; a dial located in said recess; a pointer adapted to move over said dial; a rack carried by said spindle; a train of gearing located within said recess and operated from said rack, and through which movement of said spindle is transmitted to said pointer; means coöperating with said gearing to prevent lost motion therein; a lever within said recess and pivoted at one end and rounded at its free end; a yoke carried by said spindle and with which the rounded end of said lever engages; and a second lever pivoted intermediate its ends within said recess; one end of said second lever extending without said recess and the other end thereof being connected with said first mentioned lever to thereby operate it.

7. In a device of the class described, a frame provided with a housing and with a recess; a spindle within said housing and capable of motion of translation therein; an anvil carried by said frame and located in line with said spindle; a dial located in said recess; a pointer adapted to move over said dial; a rack carried by said spindle; a train of gearing located within said recess and operated from said rack, and through which movement of said spindle is transmitted to said pointer; means coöperating with said gearing to prevent lost motion therein; a lever within said recess and pivoted at one end and rounded at its free end and provided with a series of teeth; a yoke carried by said spindle and with which the rounded end of said lever engages; and a second lever pivoted intermediate its ends within said recess, one end of said second lever extending without said recess and the other end thereof being provided with a series of teeth to engage the toothed portion of said first mentioned lever to thereby operate it.

8. In a device of the class described, a frame provided with a housing and with a recess; a spindle within said housing and capable of motion of translation therein; an anvil carried by said frame and located in line with said spindle; a dial located in said recess; a pointer adapted to move over said dial; a plate within said recess; a rack carried by said spindle; a train of gearing located within said recess and between said plate and the rear wall thereof, and operated from said rack and through which train movement is transmitted from said spindle to said pointer, the gears constituting said train being supported in bearings formed in said plate and in the rear wall of said recess; means within said recess and located between said plate and said dial for moving said spindle to bring it into contact with an article to be measured; and means exterior to said recess for operating said spindle moving means.

9. In a device of the class described, a frame provided with a housing and with a recess; a spindle within said housing and capable of motion of translation therein; an anvil carried by said frame and located in line with said spindle; a dial located in said recess; a pointer adapted to move over said dial; a plate within said recess; a rack carried by said spindle; a train of gearing located within said recess and between said plate and the rear wall thereof, and operated from said rack and through which train movement is transmitted from said spindle to said pointer, the gears constituting said train being supported in bearings formed in said plate and in the rear wall of said recess; a lever within said recess and located between said plate and said dial; a connection between said lever and said spindle; and means engaging said lever and extending without said recess whereby said lever may be operated to thereby bring said spindle into contact with an article to be measured.

10. In a device of the class described, a frame provided with a housing and with a recess; a spindle within said housing and capable of motion of translation therein; an anvil carried by said frame and located in line with said spindle; a dial located in said recess; a pointer adapted to move over said dial; a plate within said recess; a rack carried by said spindle; a train of gearing located within said recess and between said plate and the rear wall thereof, and operated from said rack and through which train movement is transmitted from said spindle to said pointer, the gears constituting said train being supported in bearings formed in said plate and in the rear wall of said recess; a lever within said recess and located between said plate and said dial, one end of said lever being supported by a suitable pivot; a connection between the other end of said lever and said spindle; a spider within said recess and located between said plate and said dial; a second lever supported by said spider and one end thereof extending without said recess; and means connecting the other end of said second lever with said first mentioned lever.

11. In a device of the class described, a frame provided with a housing and with a recess; a spindle within said housing and capable of motion of translation therein; an anvil carried by said frame and located in line with said spindle; a dial located in said recess; a pointer adapted to move over said dial; a plate within said recess; a rack carried by said spindle; a train of gearing located within said recess and between said plate and the rear wall thereof, and operated from said rack and through which train movement is transmitted from said spindle to said pointer, the gears constituting said train being supported in bearings formed in said plate and in the rear wall of said recess; a lever within said recess and located between said plate and said dial, one end of said lever being supported by a suitable pivot, and the other end thereof being rounded; a toothed sector formed upon said lever; a yoke carried by said spindle and with which the rounded end of said lever engages; a spider within said recess and located between said plate and said dial; and a bell crank lever supported by said spider, one arm thereof extending without said recess and the other arm being provided with teeth to engage the toothed sector of said first mentioned lever to thereby operate it.

12. In a device of the class described, a frame provided with a housing and with a recess; a spindle within said housing and capable of motion of translation therein; an anvil carried by said frame and located in line with said spindle; a dial located in said recess and provided with a slot; a pointer adapted to move over said dial; a plate within said recess; a rack carried by said spindle; a train of gearing located within said recess and between said plate and the rear wall thereof, and operated from said rack and through which train movement is transmitted from said spindle to said pointer, the gears constituting said train being supported in bearings formed in said plate and in the rear wall of said recess; means within said recess and located between said plate and said dial for moving said spindle to bring it into contact with an article to be measured; a pointer carried by said spindle moving means and adapted to extend through the slot in said dial; and means exterior to said recess for operating said spindle moving means.

13. In a device of the class described, a frame provided with a housing and with a recess; a spindle within said housing and capable of motion of translation therein; an anvil carried by said frame and located in line with said spindle; a dial located in said recess and provided with a slot; a pointer adapted to move over said dial; a plate within said recess; a rack carried by said spindle; a train of gearing located within said recess and between said plate and the rear wall thereof, and operated from said rack and through which train movement is transmitted from said spindle to said pointer, the gears constituting said train being supported in bearings formed in said plate and in the rear wall of said recess; a lever within said recess and located between said plate and said dial; a pointer carried by said lever and adapted to extend through the slot in said dial; a connection between said lever and said spindle; and means engaging said lever and extending without said recess whereby said lever may be operated to thereby bring said spindle into contact with an article to be measured.

14. In a device of the class described, a frame provided with a housing and with a recess; a spindle within said housing and capable of motion of translation therein; an anvil carried by said frame and located in line with said spindle; a dial located in said recess and provided with a slot; a pointer adapted to move over said dial; a plate within said recess; a rack carried by said spindle; a train of gearing located within said recess and between said plate and the rear wall thereof, and operated from said rack and through which train movement is transmitted from said spindle to said pointer, the gears constituting said train being supported in bearings formed in said plate and in the rear wall of said recess; a lever within said recess and located between said plate and said dial, one end of said lever being supported by a suitable pivot, a connection between the other end of said lever and said spindle; a pointer located at the free end of said lever and adapted to extend through the slot in said dial; a spider within said recess and located between said plate and said dial; a second lever supported by said spider and one end thereof extending without said recess; and means connecting the other end of said second lever with said first mentioned lever.

15. In a device of the class described, a frame provided with a housing and with a recess; a spindle within said housing and capable of motion of translation therein; an anvil carried by said frame and located in line with said spindle; a dial located in said recess and provided with a slot; a pointer adapted to move over said dial; a plate within said recess; a rack carried by said spindle; a train of gearing located within said recess and between said plate and the rear wall thereof, and operated from said rack and through which train movement is transmitted from said spindle to said pointer, the gears constituting said train being supported in bearings formed in said plate and in the rear wall of said recess; a lever within said recess and located between said plate and said dial, one end of said lever being supported by a suitable pivot, and the other end thereof being rounded; a toothed sector formed upon said lever; a yoke carried by said spindle and with which the rounded end of said lever engages; a pointer located at the rounded end of said lever and adapted to extend through the slot in said dial; a spider within said recess and located between said plate and said dial; and a bell crank lever supported by said spider, one arm thereof extending without said recess and the other arm being provided with teeth to engage the toothed sector of said first mentioned lever to thereby operate it.

16. In a measuring instrument, a scale; and a pointer adapted to move over said scale, said pointer terminating in three points disposed in a plane parallel with the scale, and the location of the outer points being respectively one quarter and one half of a scale division distant from and upon either side of the middle point.

17. In a measuring instrument, a reciprocating spindle; a guide therefor; a recess formed in said guide and having inclined portions; a clamping member in the form of a segment of a ring located within said recess and the free ends of which engage the inclined portions of said recess, the arrangement of the parts being such that the inclined portions of said recess coöperate with the free ends of said clamping member to force them against opposite sides of said spindle when said clamping member is forced toward said spindle; a rod engaging the middle portion of said clamping member; and means for forcing said rod toward said clamping member.

18. In a measuring instrument, a reciprocating spindle; a guide therefor; a recess formed in said guide and having an inclined portion; a clamping member located within said recess and in engagement with the inclined portion thereof, the arrangement of the parts being such that the inclined portion of said recess coöperates with said clamping member to force it against said spindle when said clamping member is forced toward said spindle; a rod engaging said clamping member; and means for forcing said rod toward said clamping member.

19. In a measuring instrument, a reciprocating spindle; a guide therefor; a recess formed in said guide and having inclined portions; a clamping member in the form of a segment of a ring located within said recess and the free ends of which engage the inclined portions of said recess, the arrangement of the parts being such that the inclined portions of said recess coöperate with the free ends of said clamping member to force them against opposite sides of said spindle when said clamping member is forced toward said spindle; a rod engaging the middle portion of said clamping member; an operating member provided with an inclined portion in engagement with the end of said rod; and means for operating said operating member to thereby force said rod toward said clamping member.

20. In a measuring instrument, a reciprocating spindle; a guide therefor; a recess formed in said guide and having an inclined portion; a clamping member located within said recess and in engagement with the inclined portion thereof, the arrangement of the parts being such that the inclined portion of said recess coöperates with said clamping member to force it against said spindle when said clamping member is forced toward said spindle; a rod engaging said clamping member; an operating member provided with an inclined portion in engagement with the end of said rod; and means for operating said operating member to thereby force said rod toward said clamping member.

21. In a measuring instrument, a spindle; a pin projecting from the end of said spindle; a detachable face for said spindle and having a plurality of radially extending grooves any one of which may be so placed as to embrace said pin; and a screw extending longitudinally of said spindle and adapted to engage said detachable face to hold it in position.

22. In a measuring instrument, an anvil provided with a recess on its under side; a stem projecting downwardly from said anvil; a locking member movable in a direction transverse to and adapted to engage said stem, and provided with an opening; and a screw having a tapered portion adapted to engage said opening, and a point portion beyond said tapered portion and adapted to enter the recess aforesaid in the under side of said anvil.

This specification signed and witnessed this seventeenth day of October A. D. 1908.

JOHN WAHLBERG.

In the presence of—
V. HOFFMANN,
A. FORTENBACH.